US005114604A

United States Patent [19]

Ishii et al.

[11] Patent Number: 5,114,604

[45] Date of Patent: May 19, 1992

[54] RESIN BONDED PERMANENT MAGNET AND A BINDER THEREFOR

[75] Inventors: Junichi Ishii, Ichikawa; Tetsuji Takada; Takayuki Kurohara, both of Osaka, all of Japan

[73] Assignees: Koei Chemical Co., Ltd., Osaka; Sumitomo Metal Mining Co., Ltd., Tokyo, both of Japan

[21] Appl. No.: 440,205

[22] Filed: Nov. 22, 1989

[30] Foreign Application Priority Data

Nov. 24, 1988 [JP] Japan ................................ 63-294760

[51] Int. Cl.[5] .......................... C04B 35/04; H01F 1/00

[52] U.S. Cl. .................................................. 252/62.54

[58] Field of Search ................. 252/62.54; 260/37 EP

[56] References Cited

U.S. PATENT DOCUMENTS 3,819,564 6/1974 Gindrop et al. ................ 260/37 EP
4,253,886 3/1981 Aonuma et al. .................... 148/105
4,876,305 10/1989 Mazany .............................. 524/401

OTHER PUBLICATIONS

"Epoxy Resins Chemistry and Technology" Clayton A. Way, pp. 743–745; 772–778; 473–477, 468 ©1988, Mariel Dekker, Inc.-N.Y.

*Hackh's Chemical Dictionary,* p. 557, 4th Ed., McGraw-Hill, N.Y.

*Primary Examiner*—William R. Dixon, Jr.
*Assistant Examiner*—Alan Wright
*Attorney, Agent, or Firm*—Watson, Cole, Grindle & Watson

[57] ABSTRACT

A curable resin binder comprising an epoxy resin which is a solid at room temperature, an epoxy resin curing agent which is inactive at room temperature, and as a curing accelerator, a pyridine derivative containing at least one hydroxyl group in a molecule. Also disclosed is a resin-bonded rare earth permanent magnet made by employing the binder and a powder of an alloy containing a rare earth metal or metals.

14 Claims, No Drawings

RESIN BONDED PERMANENT MAGNET AND A BINDER THEREFOR

BACKGROUND OF THE INVENTION

1. Field of the invention:

This invention relates to a resin bonded permanent magnet and to a curable resin binder therefor.

2. Description of the Prior Art:

Permanent magnets containing rare earth elements, such as $RCo_5$, $R_2Co_{17}$ and RFeB, in which R stands for a rare earth metal element are known. These magnets exhibit a greater amount of magnetic energy products than magnets formed from Alnico alloys or ferrites.

These magnets (hereinafter referred to as "rare earth permanent magnets") are available in two types, i.e., the sintered type and the resin-bonded type. The resin-bonded type magnet has a number of advantages over the sintered-type magnet, including:

(1) A higher degree of dimensional accuracy even when made in a complicated shape;
(2) A higher degree of uniformity in quality and performance; and
(3) A higher yield and a higher degree of machinability.

It, however, has drawbacks, too. It has a relatively low density of magnetic material and its magnetic properties decrease in proportion to the amount of resin used as a binder.

In order to obtain a resin bonded magnet of improved magnetic properties, it is necessary to minimize the amount of resin which is used to bind the magnetic powder containing the rare earth element. It is, however, also necessary a ensure the high adhesive property, heat resistance and mechanical strength.

A thermosetting, thermoplastic, or rubber-like resin has hitherto been used as a binder for making a resin bonded magnet. The thermoplastic and rubber-like resins are used mainly when magnets are made by injection or extrusion molding. The injection or extrusion molding, however, requires the use of a larger amount of resin than other molding does. The molded product has a low packing density of magnetic material and, therefore, low magnetic properties.

It has been considered that the requirements which have hereinabove been stated can be satisfied by a magnet made by compression molding employing a thermosetting resin, particularly an epoxy resin. An epoxy resin is usually employed with a curing agent and exhibits excellent mechanical and adhesive properties. These properties have made epoxy resins useful to be used for making a resin bonded magnet.

Many of the epoxy resins are, however, in the form of a liquid. When a liquid resin is used as a binder for a magnetic powder, it forms secondary particles with the powder, even if it is used only in a small quantity. The formation of secondary particles makes it difficult to satisfactorily supply a mixture of resin and powder into a mold for compression molding by usual methods. The secondary particles are likely to form bridges in the mold, resulting in a lack of uniformity in pressure across the mold, and thereby a lack of uniformity in quality of the molded products and a breakage of the mold.

Under these circumstances, attempts have been made to use a powdered resin binder in order to improve the flowability of a mixture of resin and magnetic powder to obtain a magnet of improved orientation, as disclosed in, for example, Japanese Patent Application laid open under No. 63808/1980. According to this Japanese Patent Application, a powdered resin binder is used to facilitate the movement of particles of a magnetic powder to improve the orientation thereof during compression molding in a magnetic field to produce a magnet of improved magnetic properties. It is true that a mixture of a powdered resin binder and a magnetic powder is easy to supply into a mold, since they are unlikely to form secondary particles. A magnet made by employing a powdered resin binder is, however, lower in mechanical strength than one made by employing a liquid one, since the powdered resin is less uniformly distributed in the magnet. Moreover, the powdered resin which melts when cured forms voids in the molded product which lowers its magnetic properties.

SUMMARY OF THE INVENTION

It is, therefore, an object of this invention to provide a resin bonded rare earth permanent magnet which is molded from a mixture of a resin and a magnetic powder having good flowability, and which is excellent in mechanical strength and magnetic properties.

It is another object of this invention to provide an improved resin binder which can be used for making such a magnet.

This invention is essentially based on the discovery of an improved curing agent for a resin binder and also an improved curing accelerator.

According to a first aspect of this invention, there is provided a resin-bonded rare earth permanent magnet comprising (A) a rare earth permanent magnet powder, and (B) a curable resin binder which comprises (a) an epoxy resin which is a solid at room temperature, (b) an epoxy resin curing agent which is inactive at room temperature, and (c) as a curing accelerator, a pyridine derivative containing at least one hydroxyl group in a molecule.

According to a second aspect of this invention, there is provided a curable resin binder for a permanent magnet which comprises (a) and epoxy resin which is a solid at room temperature, (b) an epoxy resin curing agent which is inactive at room temperature, and (c) as a curing accelerator, a pyridine derivative containing at least one hydroxyl group in a molecule.

The binder of this invention can be mixed with a rare earth permanent magnet powder to form a mixture of high flowability. The curing accelerator makes it possible to obtain a cured product of high mechanical strength in a relatively short time at a relatively low temperature and thereby reduce the amount of energy as required for making a resin bonded permanent magnet and improve its productivity.

The magnet of this invention is excellent in magnetic properties and mechanical strength and is believed to be useful for application to new fields of industry, as well as for improving the performance of conventional devices.

DETAILED DESCRIPTION OF THE INVENTION

The magnet of this invention comprises a rare earth permanent magnet powder which is obtained by magnetizing a magnetic powder of a rare earth compound. The compound which can be employed may be one represented as $RCo_5$, $R_2Co_{17}$, or RFeB. All of these materials can be satisfactorily used to make a good magnet. There is no particular limitation to the particle size of the powder.

Referring to each type of compound in detail, it is appropriate to use an alloy of one or more rare earth metals (R), particularly a light rare earth metal such as Sm, Pr, Nd, La or Ce, and Co, when a compound of the formula $RCo_5$ is employed. When a compound of the formula $R_2Co_{17}$ is employed, it is appropriate to use an alloy composed of one or more rare earth metals (R), particularly a light rare earth metal such as Sm, Pr, Nd, La or Ce, and Co, and further containing Fe, Cu and a high-melting metal such as Zr, Hf, W or Ti. When a compound of the formula RFeB is employed, it is appropriate to use an alloy composed of one or more rare earth metals (R), which may be either a light rare earth metal or metals, such as Sm, Pr, Nd, La and Ce, or a combination of any such light rare earth metal and a heavy rare earth metal such as Tb, Dy or Ga, and Fe and B. It may further contain another metal, such as Al, Co, Mn, Si, Ga, V, Ti, Nb, Mo, W, Zr, Zn or Cr.

The binder which is used for making the magnet contains an epoxy resin. It is required to be of the type which is a solid at room temperature, so that a mixture of the resin and a magnetic powder may have good flowability. It is also required to be of the type having at least two epoxy groups in a molecule. Examples of the appropriate resins are bisphenol A type, phenol novolak type and cresol novolak type epoxy resins Specific examples of the appropriate commercially available bisphenol A type epoxy resins are EPIKOTE 1001, 1002, 1003 and 1004, which are the products of Yuka Shell Epoxy Kabushiki Kaisha, and EPOMIK R-301, R-302 and R-304, which are the products of Mitsui Petrochemical Industries, Ltd , all having an epoxy equivalent of 300 to 1000. The phenol novolak type or cresol novolak type epoxy resin is a solid epoxy resin obtained by reacting a phenol novolak resin or cresol novolak resin with epichlorohydrin in the presence of a basic substance. Specific examples of the appropriate commercially available phenol novolak type epoxy resins are EPICLON N-770, N-637, N-870 and N-510, which are the products of Dainippon Ink and Chemicals. Inc Specific examples of the appropriate cresol novolak type epoxy resins are EPICLON N-665, N-673, N-680, N-690 and N-695, which are the products of Dainippon Ink and Chemicals, Inc.. and SUMIEPOXY ESCN-220F, ESCN-220HH and ESCN-220L, which are the products of Sumitomo Chemical Co., Ltd. It is possible to use one of these resins, or a mixture of two or more of them.

The binder also contains a curing agent which inactive at room temperature. It is possible to use as the curing agent a variety of kinds of compounds, including quanidine compounds such as dicyandiamide, quanidine and biguanide, organic acid hydrazides such as succinic dihydrazides and adipic dihydrazides, aromatic diamines such as m-phenylenediamine and diaminodiphenylmethane, melamines such as diallylmelamine, acid anhydrides such as tetrahydrophthalic, pyromellitic, polyadipic and phthalic anhydrides, and boron trifluoride-amine complexes. The appropriate amount of any guanidine compound, organic acid hydrazide, aromatic diamine, or melamine used as the curing agent is in the range which gives an active hydrogen equivalent of 0.5 to 2.5, or preferably 0.7 to 2.0, per epoxy equivalent of the epoxy resin employed. When an acid anhydride is employed, it is appropriate to use it in the amount which gives an acid anhydride equivalent of 0.5 to 2.5 , or preferably 0.7 to 2.0, per epoxy equivalent. When a boron trifluoride-amine complex is employed. it is appropriate to use 1 to 10, or preferably 2 to 7, parts by weight for 100 parts by weight of epoxy resin.

The binder further contains a pyridine derivative having at least one hydroxyl group in a molecule as a curing accelerator. Specific examples of the appropriate pyridine derivatives are hydroxypyridines such as 4-hydroxypyridine, 3-hydroxypyridine, 2-hydroxypyridine, 3-hydroxy-6-methylpyridine and 2,6-dihydroxypyridine, hydroxymethylpyridines such as 2-hydroxymethylpyridine, 3-hydroxymethylpyridine, 4-hydroxymethylpyridines and 2,6-di(hydroxymethyl)pyridine, and hydroxyethylpyridines such as 2-(2-pyridyl)-1,3propanediol, 2-hydroxymethyl-2-(4-pyridyl)-1,3-propanediol, 2-hydroxyethylpyridine, 4-hydroxyethylpyridine and 5-ethyl-2-hydroxylethylpyridine. The curing accelerator may consist of either one or more of these compounds. The use of hydroxypyridines is particularly preferable, as they are crystalline solids in room temperature. Any such hydroxypyridine is mixed and dispersed in a solvent with the epoxy resin and the curing agent to prepare the binder, the binder is mixed with the rare earth permanent magnet powder, and when the solvent is removed, there is obtained a composition of good storage stability. The binder may contain the pyridine derivative in an amount ranging from 0.1 to 15%, or preferably from 0.25 to 10%, by weight of the epoxy resin. If the proportion of the pyridine derivative is smaller than 0.1% by weight, it fails to produce any satisfactory result. If it exceeds 15% by weight, it cannot be expected to produce any better result, but is likely to have an adverse effect on the properties of the cured product.

The binder may be employed in an amount ranging from 0.3 to 10%, or preferably from 0.5 to 8%, by weight of the magnetic powder. If the proportion of the binder is smaller than 0.3% by weight, there will be obtained only a magnet of low mechanical strength, and moreover, the mold will get worn heavily. If it exceeds 10%by weight, there will be obtained only a magnet of low magnetic properties. The binder of this invention can be cured at a relatively low temperature in a relatively short time, owing to the pyridine derivative which it contains as the curing accelerator, as hereinabove described.

The permanent magnet of this invention can be made by supplying a mixture of the binder and the rare earth permanent magnet powder into a mold, compression molding it, while applying a magnetic field across it, and heating a molded product to cure the resin. It is sufficient to heat the molded product at a temperature of 130° C. to 150° C. for a period of 10 to 30 minutes, since the binder is curable at a low temperature in a short time, as hereinabove stated. The magnetization of the rare earth permanent magnet powder can be effected not only during compression molding, but also after the molded product has been cured.

The binder is preferably dissolved or dispersed in an organic solvent selected from among, for example, ketones such as acetone, methyl ethyl ketone and methyl isobutyl ketone, alcohols such as methanol and ethanol, and tetraydrofuran. Its solution or dispersion is mixed with the are earth permanent magnet powder and after the solvent has been removed from their mixture, it is molded, the molded product is cured, and the cured product is magnetized, whereby it is possible to make a resin bonded permanent magnet having much more excellent mechanical and magnetic properties.

The invention will now be described more specially with reference to a variety of examples and comparative examples.

EXAMPLES 1 TO 23 AND COMPARATIVE EXAMPLES 1 TO 10

TABLE 1 shows the curable resin binders and the organic solvent which were employed to carry out the EXAMPLES and COMPARATIVE EXAMPLES, and TABLE 2 shows the alloy powders. The binder and alloy powder which were employed differed from one EXAMPLE or COMPARATIVE EXAMPLE to another, as shown in TABLE 3 or 4. The binder and the solvent were mixed with 100 parts of alloy powder and the mixture thereof was subjected to one hour of solvent removal treatment in a vacuum. Then, the mixture was crushed in a stamp mill to a mean particle size not exceeding 35 mesh (JIS) to prepare an alloy powder I containing a curable resin binder.

The flowability of each powder I into a mold for press molding was determined by feeding into a mold having an outside diameter of 20 mm, an inside diameter of 18 mm and a cavity depth of 35 mm, so that the mold might contain a mass of powder having an upper level flush with the upper end of the mold, and weighing the powder which could be fed into the mold. The average value and the standard deviation were obtained from 15 samples.

The powder I was molded at a pressure of 5 tons/cm$^2$ in a magnetic field having a strength of 15 kOe. The molded product was heated at 130° C. for 20 minutes, whereby the binder was cured to yield a magnet, while in each of COMPARATIVE EXAMPLES 1 to 5, the molded product was heated at 130° C. for three hours.

The magnetic properties of the magnet were determined by a DC self-recording fluxmeter made by Toei Kogyo Co., Ltd. The maximum bending stress that the magnet could withstand was determined by an autograph made by Shimazu Corporation, and was employed as a measure of its mechanical strength.

The amount of the binder used, the flowability of the powder, and the magnetic properties and mechanical strength of the magnet are shown in TABLE 3 for each of EXAMPLES 1 to 23, and in TABLE 4 for each of COMPARATIVE EXAMPLES 1 to 10.

TABLE 1

| Curable resin binder No. | | Curable resin binder composition: Epoxy resin | Curing agent | Pyridine derivative having hydroxyl groups | Solvent (Methyl ethyl ketone) |
|---|---|---|---|---|---|
| Binder of the invention | 1 | 100 parts of cresol novolak type epoxy resin "EPICLON N-695" | 10 parts of dicyandiamide | 4 parts of 3-hydroxypyridine | 300 parts |
| | 2 | Same as above | Same as above | 4 parts of 4-hydroxypyridine | 300 parts |
| | 3 | Same as above | Same as above | 4 parts of 3-hydroxymethyl-pyridine | 300 parts |
| | 4 | Same as above | Same as above | 4 parts of 2-hydroxymethyl-pyridine | 300 parts |
| Comparative binder | 5 | 100 parts of Bisphenol A type liquid epoxy resin "EPIKOTE-828" | 6 parts of 2-ethyl-4-methyl-imidazole | — | — |
| | 6 | 100 parts of "EPICLON N-695" | 10 parts of dicyandiamide | — | 300 parts |

Note:
EPICLON N-695: Product of Dainippon Ink & Chemicals, Inc.; and EPIKOTE -828: Product of Yuka Shell Epoxy Kabushiki Kaisha.

TABLE 2

| Alloy powder No. | Alloy powder composition (atom %): Sm | Pr | Co | Fe | Cu | Zr | Nd | B |
|---|---|---|---|---|---|---|---|---|
| 1 | 16.6 | | 83.3 | | | | | |
| 2 | 11.3 | 5.3 | 83.3 | | | | | |
| 3 | 11.7 | | 55.0 | 25.0 | 0.07 | 0.02 | | |
| 4 | | | | 81.4 | | | 13.6 | 5.0 |
| 5 | | | 5.5 | 77.3 | | | 12.2 | 5.0 |

TABLE 3

| Example No. | Curable resin binder No. | Alloy powder No. | Proportion of resin (wt. %) | Flowability: Average amount fed (g) | Standard deviation | Magnetic properties: Br (kG) | iHc (kOe) | (BH) max (MG Oe) | Mechanical strength (kg/mm$^2$) |
|---|---|---|---|---|---|---|---|---|---|
| 1 | 1 | 1 | 2.5 | 3.522 | 0.0096 | 7.0 | 9.3 | 12.5 | 5.0 |
| 2 | 2 | 1 | 2.5 | 3.435 | 0.0059 | 6.9 | 8.7 | 12.3 | 5.5 |
| 3 | 3 | 1 | 2.5 | 3.495 | 0.0077 | 7.0 | 9.0 | 12.4 | 5.1 |
| 4 | 4 | 1 | 2.5 | 3.409 | 0.0081 | 7.1 | 8.9 | 12.5 | 5.7 |
| 5 | 1 | 1 | 0.5 | 3.593 | 0.0061 | 7.2 | 9.2 | 12.6 | 4.9 |
| 6 | 1 | 1 | 9.0 | 3.451 | 0.0095 | 6.8 | 9.2 | 12.1 | 6.4 |
| 7 | 1 | 2 | 2.5 | 3.518 | 0.0087 | 7.3 | 8.6 | 12.8 | 5.5 |
| 8 | 1 | 3 | 1.5 | 3.874 | 0.0076 | 8.3 | 9.6 | 13.5 | 5.1 |
| 9 | 2 | 3 | 1.5 | 3.738 | 0.0051 | 8.4 | 10.2 | 13.7 | 5.7 |
| 10 | 1 | 3 | 0.5 | 3.913 | 0.0043 | 8.5 | 9.5 | 13.8 | 4.9 |
| 11 | 1 | 3 | 9.0 | 3.834 | 0.0089 | 8.1 | 9.5 | 13.2 | 6.2 |
| 12 | 1 | 4 | 2.0 | 3.455 | 0.0077 | 6.7 | 16.0 | 9.4 | 5.5 |

TABLE 3-continued

| Example No. | Curable resin binder No. | Alloy powder No. | Proportion of resin (wt. %) | Flowability: Average amount fed (g) | Flowability: Standard deviation | Magnetic properties: Br (kG) | Magnetic properties: iHc (kOe) | Magnetic properties: (BH) max (MG Oe) | Mechanical strength (kg/mm²) |
|---|---|---|---|---|---|---|---|---|---|
| 13 | 2 | 4 | 2.0 | 3.329 | 0.0055 | 6.6 | 15.9 | 9.3 | 7.0 |
| 14 | 3 | 4 | 2.0 | 3.386 | 0.0065 | 6.6 | 16.1 | 9.4 | 6.0 |
| 15 | 4 | 4 | 2.0 | 3.277 | 0.0054 | 6.6 | 15.9 | 9.3 | 6.5 |
| 16 | 1 | 4 | 0.5 | 3.525 | 0.0069 | 6.8 | 15.8 | 9.5 | 5.1 |
| 17 | 1 | 4 | 9.0 | 3.385 | 0.0088 | 6.3 | 15.6 | 9.1 | 7.4 |
| 18 | 1 | 5 | 2.0 | 3.459 | 0.0087 | 7.2 | 10.3 | 10.2 | 5.2 |
| 19 | 2 | 5 | 2.0 | 3.337 | 0.0041 | 7.3 | 10.1 | 10.3 | 7.3 |
| 20 | 3 | 5 | 2.0 | 3.395 | 0.0066 | 7.2 | 10.3 | 10.2 | 5.5 |
| 21 | 4 | 5 | 2.0 | 3.275 | 0.0066 | 7.3 | 9.9 | 10.2 | 6.9 |
| 22 | 1 | 5 | 0.5 | 3.529 | 0.0062 | 7.3 | 10.4 | 10.3 | 5.0 |
| 23 | 1 | 5 | 9.0 | 3.389 | 0.0091 | 7.1 | 9.8 | 9.9 | 7.2 |

TABLE 4

| Comparable Example No. | Curable resin binder No. | Alloy powder No. | Proportion of resin (wt. %) | Flowability: Average amount fed (g) | Flowability: Standard deviation | Magnetic properties: Br (kG) | Magnetic properties: iHc (kOe) | Magnetic properties: (BH) max (MG Oe) | Mechanical strength (kg/mm²) |
|---|---|---|---|---|---|---|---|---|---|
| 1 | 5 | 1 | 2.5 | 1.718 | 0.101 | 6.8 | 9.6 | 12.0 | 4.8 |
| 2 | 5 | 2 | 2.5 | 1.710 | 0.095 | 7.0 | 8.2 | 12.1 | 4.9 |
| 3 | 5 | 3 | 1.5 | 1.771 | 0.082 | 8.0 | 9.6 | 13.0 | 5.8 |
| 4 | 5 | 4 | 2.0 | 1.495 | 0.081 | 6.5 | 15.7 | 9.2 | 5.5 |
| 5 | 5 | 5 | 2.0 | 1.550 | 0.076 | 7.0 | 10.1 | 9.8 | 5.9 |
| 6 | 6 | 1 | 2.5 | 3.732 | 0.0066 | 7.0 | 9.4 | 12.5 | 1.7 |
| 7 | 6 | 2 | 2.5 | 3.726 | 0.0074 | 7.3 | 8.5 | 12.8 | 1.8 |
| 8 | 6 | 3 | 1.5 | 3.847 | 0.0051 | 8.3 | 9.7 | 13.4 | 2.0 |
| 9 | 6 | 4 | 2.0 | 3.359 | 0.0044 | 6.6 | 16.0 | 9.4 | 2.3 |
| 10 | 6 | 5 | 2.0 | 3.666 | 0.0036 | 7.2 | 10.1 | 10.2 | 2.2 |

What is claimed is:

1. A resin bonded rare earth permanent magnet comprising:

(A) a rare earth permanent magnet powder; and (B) a cured product of a curable resin binder which comprises:

(a) an epoxy resin which is a solid at room temperature, (b) an epoxy resin curing agent which is inactive at room temperature, said epoxy resin curing agent consisting of a guanidine compound selected from the group consisting of dicyandiamide, guanidine and biguanide, and (c) as a curing accelerator, a pyridine derivative containing at least one hydroxyl group in a molecule.

2. A permanent magnet as set forth in claim 1, wherein said powder is formed of an alloy containing at least one of Co and a light rare earth metal selected from the group consisting of Sm, Pr, Nd, La, and Ce.

3. A permanent magnet as set forth in claim 1, wherein said powder is formed of an alloy containing at least one of Co and a light rare earth metal selected from the group consisting of Sm, Pr, Nd, La, and Ce, an additional metal selected from the group consisting of Fe and a high-melting metal selected from the group consisting of Zr, Hf, W and Ti.

4. A permanent magnet as set forth in claim 1, wherein said powder is formed of an alloy containing at least one light rare earth metal selected from the group consisting of Sm, Pr, Nd, La and Ce, and an additional metal selected from the group consisting of Fe and B.

5. A permanent magnet as set forth in claim 4, herein said alloy further contains at least one heavy rare earth metal selected from the group consisting of Tb, Dy and Gd.

6. A permanent magnet as set forth in claim 4 or 5, wherein said alloy further contains at least one metal selected from the group consisting of Al, Co, Mn, Si, Ga, V, Ti, Nb, Mo, W, Zr, Zn and Cr.

7. A permanent magnet as set forth in claim 1, wherein said binder has a proportion of 0.3 to 10 parts by weight for 100 parts by weight of said powder.

8. A permanent magnet as set forth in claim 7, wherein said proportion of said binder ranges from 0.5 to 8 parts by weight.

9. A curable resin binder for a permanent magnet comprising:

(a) an epoxy resin which is a solid at room temperature;

(b) an epoxy resin curing agent which is inactive at room temperature, said epoxy resin curing agent consisting of a guanidine compound selected from the group consisting of dicyandiamide, guanidine and biguanide; and (c) as a curing accelerator, a pyridine derivative containing at least one hydroxyl group in a molecule.

10. A binder as set forth in claim 9, wherein said epoxy resin is selected from the group consisting of bisphenol A, phenol novolak, and cresol novolak epoxy resins.

11. A binder as set forth in claim 9, wherein said curing agent is employed in an amount giving an active hydrogen equivalent of 0.5 to 2.5 per epoxy equivalent.

12. A binder as set forth in claim 9, containing pyridine derivative in an amount of 0.1 to 15% by weight of said epoxy resin.

13. A binder set forth in claim 9, containing pyridine derivative in an amount of 0.1 to 15% by weight of said epoxy resin.

14. A binder as set forth in claim 13, containing 0.25 to 10% by weight of said epoxy resin.

* * * * *